United States Patent Office 3,476,586
Patented Nov. 4, 1969

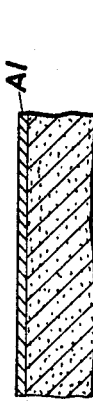
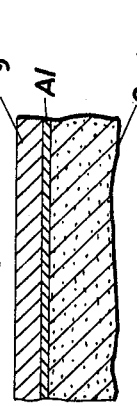
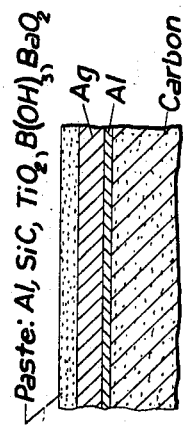
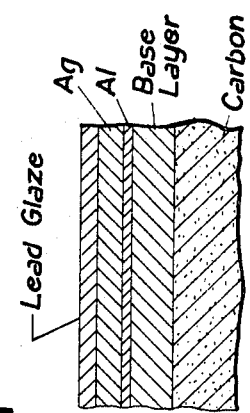
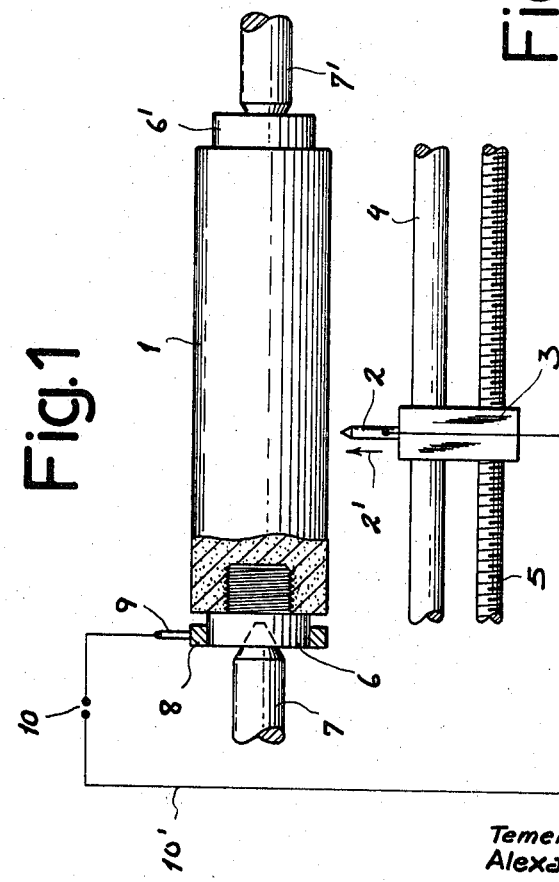

3,476,586
METHOD OF COATING CARBON BODIES AND THE RESULTING PRODUCTS
Alexander J. Valtchev and Temenushka Nikolova Valtcheva, Sofia, Bulgaria, assignors to Metalurgitschen Zavod "Lenin," Pernik, Bulgaria, a corporation of Bulgaria
Continuation-in-part of application Ser. No. 255,126, Jan. 30, 1963. This application Mar. 29, 1966, Ser. No. 538,413
Claims priority, application Bulgaria, Mar. 29, 1965, I-362
Int. Cl. B44d *1/14;* H01m *13/04*
U.S. Cl. 117—71                                    7 Claims

ABSTRACT OF THE DISCLOSURE

A method of coating carbon articles wherein a disperse layer of molten aluminum is sprayed upon a surface of the body. Thereafter, a layer of copper, silver, gold, iron, cobalt, nickel, tin, lead, titanium zirconium is applied is applied as both layers are bonded to the carbon body by treating the latter with an electric arc. The electric-arc treatment blends the separate layers into a homogeneous layer. A layer of an electron-emissive material may be applied over the second metal layer prior to electric-arc treatment. Layers of metal and low-melting oxides may be applied over the first composite layer.

---

This application is a continuation-in-part of our application Ser. No. 255,126 filed January 30, 1963 (now U.S. Patent No. 3,348,929 of October 24, 1967).

Our present invention relates to a method of applying protective coatings to surfaces of carbon bodies as well as to the carbon articles thus produced.

The application of protective coatings to carbon bodies, especially when such bodies are to be used at elevated temperatures in oxidizing and other corrosive atmospheres, is especially desirable and it has been proposed heretofore to provide such coatings by heating the carbon body to an elevated temperature in a protective medium. In this manner, it is possible to form silicon carbide layers along the surfaces of the carbon articles, such layers being further improved to withstand temperatures up to 1500° C., at which silicon carbide tends to oxidize, by incorporating in the coating silicon nitride and elemental silicon. Similar techniques are employed to produce metallic coatings and carbides, silicides and nitrides or other compounds of the elements of the Groups IV–A and VI–A of the Periodic Table (long form), e.g. as given on pages 448 and 449 of Handbook of Chemistry and Physics, 41st edition, Chemical Rubber Publishing Company, Ohio. It has been found, however, that such coatings have only a limited life at temperatures of the order of 1500° C. because, at these temperatures, the diffusion of carbon into the coating layer converts the coatings into interstitial carbides prone to oxidation.

It has also been proposed to provide enamel-like or vitreous coatings on surfaces of a carbon article by applying an oxide layer, in the manner of a glaze, to the surface and melting the protective layer by heating in ambient atmospheric conditions to a moderate temperature of, say, 600° C. to form a continuous layer. Such coatings are satisfactory only at relatively low temperatures (e.g. up to 1000° C.) and have found practical application only in certain fields such as with nuclear reactors. The vapor-deposition of a coating of high-melting point from a quiescent vapor phase or a plasma has also been employed in connection with rocket research and such coatings have been formed to withstand temperatures of 2500° to 3000° C. for periods of up to two minutes. As a practical matter, however, the use of plasma deposition is so much more expensive than any other method hitherto proposed for the forming of coatings on carbon as to severely limit the use of the method. The cost of plasma deposition arises in large measure from the much higher energy required and the need for relatively expensive inert gases in large quantities to serve as carriers for the coating substances.

When it is recognized that carbon bodies are widely used in corrosive environments and at elevated temperatures, it will be apparent that the problem in one which has long concerned the art and has hitherto admitted of no satisfactory solution. For example, carbon electrodes are used widely in electrothermal industrial processes of which a most important application is in electric-arc furnaces for the production of steel. In the absence of a protective coating, the oxidation of the electrodes occurs at a rate many times greater than that prevalent when protective layers are employed and much research has gone into finding satisfactory coatings for carbon electrodes because of this fact. The coatings described above are either economically prohibitive or are physically or chemically unsatisfactory for coating electrodes for steelmaking furnaces and other electrothermal industrial processes. For one thing, the conventional coatings have only a limited life, as mentioned earlier, and last for periods ranging from only several minutes to a maximum of about 100 hours. The reasons for the deterioration of the coatings and their deterioration rates have been found to be a complex function of many variables including chemical reaction between the elemental carbon and the materials of the coating, reaction of the carbides and the materials of the coating with the surrounding medium (e.g. with oxygen), physical sensitivity of the coating to temperature fluctuation, the presence, absence or nature of microdefects or dislocations in the surface or thickness of the coating, or the process characteristics of the coated electrodes. For the most part, it can be safely said that the prior art has provided no economically feasible method of coating a carbon article in such manner that it can be used in an oxidizing atmosphere at elevated temperature with a useful life of the order of tens to thousands of hours. It may also be stated that there have been no satisfactory proposals heretofore, except for that of the copending application mentioned earlier, for the application of coating materials which are at once long-wearing and highly resistive to deterioration in corrosive environments and strongly bonded to the carbon bodies.

It has been suggested in the aforementioned application that aluminum coatings upon a carbon article, treated with electric arc are suitable as electrodes for electric-arc furnaces and decreases the wear of the surface. Even such aluminum coatings are unsatisfactory by virtue of their oxidation to compounds such as $Al_2O_3$ and are not suitable where useful lives of hundreds or thousands of hours are required. It may also be pointed out that conventional systems cannot be modified at will to employ coatings derived from metals such as tin, silver, iron and nickel along the surface of the carbon electrode.

It is, therefore, a principal object of the present invention to provide an improved method of making a coated carbon article whereby it is possible to selectively vary the composition of the surface coating without materially interfering with its bonding to the carbon body and yet produce an article whose wear resistance, resistance to corrosion and endurance at elevated temperatures is substantially higher than has been attainable heretofore.

Another object of this invention is to provide a coated carbon article whose surface is capable of withstanding corrosive conditions at elevated temperatures for long periods.

Still another object of our invention is to provide a method of applying a protective surface coating to a carbon body (e.g. an electrode) such that the coating is firmly bonded to the carbon substrate and can withstand elevated temperatures for prolonged periods.

We have discovered that it is possible to firmly bond a protective coating to the surface of a carbon body and, at the same time, impart an arbitrary or selectively variable composition to the coating so that its characteristics are determinable at will, when a relatively thin layer of aluminum is deposited upon the carbon surface by spraying it in molten state to form a more or less finely dispersed structure; thereafter, the method of the present invention involves the application of a metallic layer and/or an oxide layer, at least the former being deposited by spraying it in molten state and thereafter treating by electric-arc.

The surprising results thus obtained are totally unexpected, as will be evident from the well-known fact that graphite does not normally permit the bonding to its surface of metals which do not readily form carbides. It has been found that many metals (e.g. copper, iron and tin as well as the precious metals) have a surface tension so that by overheating in an electric arc the molten metals form droplets which do not wet or bond to the carbon layer. In face of this demonstrable phenomenon, it was indeed surprising that upon laying a lowermost compact layer of aluminum it is possible, by treatment with electric arc, to fix to the carbon surface metals of the class described as not readily bondable to carbon directly. While applicants do not wish to commit themselves to any theory in this regard, it appears that the ability of the aluminum metal to bond to the graphite arises from a high surface tension of a thin layer of aluminum oxide ($Al_2O_3$) which envelops the metallic aluminum grains deposited in dispersed form upon the surface. These surface forces are apparently very great since, even with a relatively low aluminum content in the coating (e.g. under 5%) and a high concentration of precious metal (e.g. 90% silver), the high temperatures of the electric arc produce a compact and uninterrupted coating and the surface forces prevent any disruption of the base layer.

In order to ensure a disperse character for this initial layer of the coating, we have found it desirable to deposit the layer of aluminum by spraying it in a molten state. Thereafter, a succeeding layer is applied and the composite coating treated with the electric arc. It has been found desirable to apply this layer also by molten-metal spraying and to bond the composite to the carbon with the aid of the electric arc. It has been found that this arrangement permits the electric arc to be effective with a coating of many times greater thickness and density than when the materials are applied as a paste or powder layer.

It is thus an important feature of this invention that a metallic layer, generally nonbondable to graphite or other carbon bodies, is applied to a base layer of aluminum deposited by spray methods and bonded to the graphite with electric-arc heating. These metallic layers can be selected from the group consisting of copper, silver and gold (relatively noble metals), iron, cobalt and nickel (members of the iron group of transition elements) and tin, lead or chromium. These metals are spray-deposited upon the aluminum-base layer either individually, in succession or jointly, and are bonded to both the base layer and the carbon substrate by arc heating. It is also possible to use titanium and zirconium alone or in combination with each other, although titanium and zirconium must be deposited under a protective atmosphere.

According to a further feature of this invention, an electric emissive layer of a good thermionic emitter is deposited upon the metallic layers in the form of a paste or powder in order to facilitate the development of the electric arc required for playing the arc along the surface. The uppermost layer may, moreover, include other substances designed to improve the qualities of the surface both with respect to heat resistance and duration of life. It will be understood that the electron-emissive materials, usually oxides or other compounds containing electro-negative elements, may facilitate the calm burning of the electric arc. Thus, substances of a thermionic type, such as barium and barium compounds (e.g. barium oxide and barium peroxide), high-melting substances (e.g. graphite, boron carbide, silicon carbide, titanium carbide and zirconium carbide), and aluminothermal mixtures (e.g. powdered aluminum in combination with powdered silicon and oxides) may be pasted with advantage onto the metallic layer. Suitable oxides for use together with aluminum or independently thereof include boric oxide ($B_2O_3$), silicon dioxide, titanium dioxide and chromium oxide ($Cr_2O_3$), and other oxides, including copper oxide, ferric oxide and stannic oxide, have also proved suitable. In general, best results are obtained when the electric-arc treatment is carried out by juxtaposing the carbonaceous article with an electrode adapted to develop an arc extending perpendicularly to the treated surface while the arc is played substantially uniformly over the entire surface.

The foregoing objects, features and advantages of this invention will become more readily apparent from the following description, reference being made to the accompanying drawing in which:

FIG. 1 is a diagrammatic elevational view, partly broken away, of an apparatus for carrying out the process of the present invention; and FIGS. 2–5 are a series of idealized cross-sectional views through a surface portion of a carbon body illustrating the successive steps of a method of the present invention.

Referring now to FIG. 1 of the drawing, it can be seen that a cylindrical carbon body adapted to be used as an electrode for an electric-arc furnace or the like can be provided with the successive layers of coating material, as described in greater detail hereinafter, and mounted between centers 7, 7′ for rotation about the axis of the cylindrical carbon body 1. The electric-arc heating of the surface is effected by means of an electrode 2 extending perpendicularly to the surface of the body 1 and mounted in a cross-feed electrode holder of the usual lathe type so that the electrode 2 may be advanced in the direction of the workpiece (arrow 2′) as well as shifted axially therealong by a lead screw 5. The holder 3 is carried by the guide rail 4 for axially sliding movement with respect to the carbon body 1. Electrode 2 thus lies along a radius of the body 1 and in an axial plane thereof. In order to support the electrode 1 between the center 7 and 7′, metallic holders 6, 6′ having the configuration of plugs are threaded into the opposite ends of the body 1. The body 1 is connected to one terminal of a source of electric-arc current as represented at 10 via a brush 9 in engagement with the contact or slip ring 8 carried by the plug 6. The other terminal of the electro-current source is returned to the electrode 2 via the lead 10′.

While the composition of the lateral electrode is immaterial and has only the function of sustaining the heating arc, it is usually composed of a graphitic material and is dimensioned to develop an electric arc of a diameter of 8 to 12 mm. to heat a correspondingly dimensioned aerial zone of the body 1 opposite the electrode 2 to the elevated temperature of the arc. A heating strip of corresponding width extends along the body 1 as it rotates past the electrode 2 and, when the longitudinal flow of the electrode 2 is less than this width per revolution of the workpiece 1, the high temperature is gradually played uniformly over the entire workpiece surface during relative movement of the workpiece and the electrode. The heating and cooling of the coating are effected by the electric arc in relatively short times (e.g. of the order of tenth of a second) and no substantial oxidation of the coating from ambient air appears to occur during the short heating period. It is thus possible to carry out the treatment with the electric arc in the presence of ambient atmosphere and without the need for protective blankets of nonoxidizing gas; there is no observable deterioration of the components of the coating as a consequence of such open treatment. Moreover, the temperature to which the coating material is exposed can be elected at any suitable level by proper choice of the arc-current density and the speed of movement (peripheral speed of the body).

In general, it has been found necessary during the first electric-arc treatment to heat the layers to a temperature of 2000 to 2200° C. in order to effect a satisfactory bonding of the layers to the carbon substrate. At such high temperatures, the various coating layers appear to merge together so that the protective coating after such arc treatment has a substantially homogeneous character. It is also possible to modify the sequence of steps, in accordance with this invention, so that the initial layer is heated by electric arc to a temperature of this order of magnitude while the second and subsequent layers are subjected to arc-heating to a lower temperature (e.g. by increasing the relative speed of the body and the electrode or decreasing the current), thereby producing only a slight interdiffusion or intermelting of the upper layers. The result is a microlaminate structure in which the individual layers can be discerned upon microscopic examination.

We have found, moreover, that this method makes it possible to successively apply layers having a thickness in excess of 1 mm. to a carbon substrate; it is, however, a more convenient practice to employ thinner layers and obtain the desired physical, chemical and electrical properties by combining several layers in the coating. Furthermore, the coating produced with the aid of electric-arc heating, as described, may itself serve as a base for other material to be applied by conventional processes, such processes obviating the use of the electric arc or aluminum.

Such convenient layers can be metallizing coatings or oxide layers with relatively low melting points. Thus, oxidation of the protective coating can be reduced by applying aluminum, nickel or chromium as a surfacing layer, while silver and gold surfacing layers are employed to provide coating with high resistance to oxidation and low permeability to gases. Copper, aluminum and silver may serve as the surfacing layer when the carbon body is to have a relatively low contact resistance and, when wear resistance is essential, I contemplate producing the coating with a relatively thick layer of iron.

It is also possible, in accordance with the present invention, to improve the gas impermeability of the coating by means of a low-melting surface oxide layer having a glassy character. The low-melting oxide layer can include one or more of boric oxide, silicon dioxide, lead oxide, sodium oxide and potassium oxide with a composition determined mainly by the desired melting point of the oxide layer and the temperature at which the carbon body is to be employed. Unstable oxide layers which may evaporate at the temperature of use or which react with the metals of the coating or detrimentally with material surrounding the carbon body cannot be employed.

Low melting point coatings containing aluminum and tin alloys, preferably aluminum-tin alloys, can be used since these coatings have low melting points and afford a high degree of protection also at temperatures between 400° and 600° C.

When the coating on the surface of the carbon body is composed mainly of silver with a relatively small quantity of aluminum, it has been found that the uppermost layer thereon of a low-melting oxide or oxides will ensure a reliable gas-impermeability for more than 1000 hours. By comparison with aluminum coatings, the present invention results in a gas impermeability several dozen times greater. The uppermost layer may also contain chromium and nickel which impart increased resistance to oxidation, especially when they are present in relatively large proportion. The uppermost layer can, moreover, consist entirely of metals such as iron, copper and the like which have hitherto been found to be impractical as coatings on carbon bodies.

The following specific examples illustrate the best mode known to me for taking advantage of the present invention and are considered to be merely demonstrative of the practical aspects of this invention, although each of the techniques and structures described are surprisingly far superior than any which have been produced heretofore. The specific examples are described with reference to FIGS. 2–5 of the instant drawing where advantageous.

EXAMPLE I

A cylindrical carbon-electrode body has its peripheral surface coated by a base layer as follows:

100 grams/$m^2$ of metallic aluminum is deposited in disperse form upon the carbon body by spray techniques using conventional electrometallization apparatus (FIG. 2) and is covered by a substantially thicker layer of metallic silver deposited in a corresponding manner; 1000 grams/$m^2$ of silver are so deposited (FIG. 3). Upon the silver layer we deposit a paste of the following composition (all quantities per square meter of surface):

25 grams aluminum, 30 grams silicon carbide, 15 grams titanium dioxide, 10 grams boric acid, 10 grams barium peroxide. The paste layer is formed by mulling the components in water and by depositing it uniformly on the silver layer (FIG. 4); after drying, the body is subjected to treatment by electric arc in the apparatus of FIG. 1 at a peripheral speed of 2 m./minute, an arc current of 120 amperes, a heating area of 8 to 12 mm., and an electrode drive such that the arc plays over the surface with a pitch of 5 mm. The resulting base layer (FIG. 5) is homogeneous and the individual layers originally deposited cannot be readily discerned. Upon this arc-treated surface are deposited by metal-spray methods successive layers of aluminum (70 grams/$m^2$), and silver (800 grams/$m^2$). Upon the silver layer a lead glaze is deposited of the following composition:

Lead oxide 85% by weight, boric oxide 10% by weight, silicon dioxide 5% by weight. The glaze is deposited in an amount of 400 grams/$m^2$ upon the surface. The body is then heated to melt the lead glaze and firmly bond the upper layer to the base layer at a temperature of 500° C.

The electrode was found to have a resistance to gas permeability many times that obtained by the application of an aluminum coating of corresponding thickness to the carbon body.

EXAMPLE II

The method of Example I was followed except that gold was substituted for silver. Again, a protective coating with a long life, resistance to elevated temperatures and gas impermeability was obtained.

In the following examples all quantities are given in terms of a square meter of surface coating for a cylindrical carbon article to be used as an electrode body.

EXAMPLE III 300 grams of aluminum and 120 grams of tin are successively deposited by spray-metallization on the surface of the carbon body, the tin deposition being effected by techniques common in the application of low-melting point metals. Upon the tin layer, a paste in water of aluminum powder (35 grams), titanium dioxide (40 grams), graphite (10 grams) and barium peroxide (10 grams)

was applied and the paste dried. Thereafter the coating was treated by electric arc in the apparatus of FIG. 1 with a peripheral speed of 8 m./minute, a pitch of 3 mm. and an arc current of 70 amperes. A homogeneous base layer resulted which was provided with a second layer made in the same manner as the basic layer. Again, a superior electrode structure with long life and limited corrodibility was obtained.

EXAMPLE IV

The method described in Example III was carried out except that lead was substituted for the same amount of tin. Again, an excellent electrode resistant to elevated temperature and of low corrodability was obtained.

EXAMPLE V 150 grams of aluminum and 300 grams of chromium were successively metallized upon the carbon surface and coated with a paste consisting of 35 grams of aluminum, 10 grams barium oxide, 20 grams boron carbide, 15 grams silicon dioxide and 20 grams chromic oxide $$(Cr_2O_3)$$

Following drying, the base coating was treated with an electric arc in the apparatus of FIG. 1 with a peripheral speed of 4 m./minutes, a pitch of 6 mm. and a current of 220 amperes to form the homogeneous layer. Upon this base layer, 50 grams of aluminum, 2500 grams of iron and 300 grams of copper were successively deposited by electro-metallizing spray-deposition. Upon these metallic layers a paste of 30 grams graphite and 30 grams titanium carbide was applied and, after drying, the second composite layer was subjected to electric-arc treatment in the apparatus of FIG. 1 with a peripheral speed of 15 m./minute, a pitch of 7 mm. and a current of 280 amperes. Again, an excellent electrode body of considerable wear resistance was obtained.

EXAMPLE VI 120 grams of aluminum and 250 titanium were successively spray-deposited by metallization methods as described above, upon the carbon surface. The spray deposition was effected in a protective atmosphere (e.g. nitrogen) and received a paste of 35 grams aluminum, 6 grams barium, 40 grams zirconium dioxide, 25 grams zirconium carbide and 30 grams metallic chromium. After drying, the body was treated with an electric arc in the apparatus of FIG. 1 at a peripheral speed of 4 m./minute, a pitch of 6 mm. and a current of 220 amperes to render the base layer substantially homogeneous. Upon this layer, 1000 grams of iron, 300 grams nickel and 200 grams copper were successively deposited by spray-metallization. An electrode body of a usable life comparable to those of the improved electrodes previously described was obtained.

EXAMPLE VII

The method of Example VI was carried out with the quantities indicated except that zirconium metal was substituted for the titanium metal of that example. Again, a superior electrode body was obtained.

EXAMPLE VIII 200 grams of aluminum, 100 grams of cobalt and 300 grams of nickel were successively deposited by spray-metallization on the carbon surface and were coated with a paste consisting of 30 grams of powdered aluminum, 20 grams of powdered silicon, 40 grams of titanium dioxide and 30 grams of silicon carbide. After drying, the base-layer coating was treated by electric arc at a peripheral speed of 5 m./minute, a pitch of 5 mm. and a current of 160 amperes in the apparatus of FIG. 1. A second or intermediate layer, identical to the first, was deposited in a similar manner and was again subjected to electric-arc treatment with the same parameters. The layers were homogeneously merged and the upper layer received a surfacing layer as follows:

400 grams each of nickel and chromium were successively deposited upon the intermediate layer thus provided and 850 grams of a water glass layer (containing 110 grams of sodium oxide and 190 grams of silicon dioxide) was applied to the chromium layer. An electrode highly resistant to thermal stress and corrosion was thus obtained. When potassium oxide was substituted for the sodium oxide of this example, similar results were obtained.

We claim:
1. A method of coating a carbon article, comprising the steps of:
  (a) depositing a disperse layer of metallic aluminum upon a surface of said article by spraying molten aluminum thereon;
  (b) applying to the aluminum layer at least one layer of another metal selected from the group which consists of copper, silver, gold, iron, cobalt, nickel, tin, lead, titanium and zirconium; and
  (c) bonding said layers to said article and blending the separate layers into a homogeneous layer by treatment of said surface with an electric arc after the application of said other layer in step (b).
2. A method of coating a carbon article, comprising the steps of:
  (a) depositing a disperse layer of metallic aluminum upon a surface of said article by spraying molten aluminum thereon;
  (b) applying to the aluminum layer at least one layer of another metal selected from the group which consists of copper, silver, gold, iron, cobalt, nickel, tin, lead titanium and zirconium;
  (c) applying to said layer of said metal in step (b) a further layer of at least one powdered substance selected from the group consisting of barium metal, barium oxide, barium peroxide, graphite, boron carbide, silicon carbide, titanium carbide, zirconium carbide, boric oxide, silicon dioxide, titanium dioxide, zirconium oxide, chromium oxide, aluminum metal and elemental silicon,
  (d) bonding said layers to said article and blending the separate layers into a homogeneous layer by treatment of said surface with an electric arc after the application of said layer in step (c), said arc being generated between said article and an electrode spaced from said further layer, said arc passing through all of said layers.
3. The method defined in claim 2 wherein said layer of said other metal is deposited upon the layer of aluminum by spraying the metal onto the disperse aluminum layer of step (a) in a molten state.
4. The method defined in claim 2 wherein a further succession of layers, including an aluminum layer, a metallic layer and a layer of said substance are applied upon the first-mentioned layers after the bonding thereof to said article by treatment with said electric arc using similar conditions to those employed for deposition of the first-mentioned layers.
5. The method defined in claim 2 wherein said surface is generally cylindrical and said layers are subjected to treatment with an electric arc by juxtaposing with said layers an electrode perpendicular to said surface and adapted to generate an electric arc having a diameter of 8 to 12 mm. on said layers, relatively displacing said surface and said electrode to sweep said arc substantially uniformly over said layer, and maintaining the intensity of the arc sufficient to generate a temperature of substantially 2000° to 2200° C. at said layers, whereby the separate layers are blended into a homogeneous layer.
6. The method defined in claim 2, further comprising the step of depositing upon the layers bonded to said article in step (d) at least one layer of a metal selected from the group consisting of aluminum, copper, silver, gold, iron, nickel and chromium and a layer of at least one low-melting oxide selected from the group consisting of boric oxide, silicon dioxide, lead oxide, sodium oxide and potassium oxide.

7. A carbon article made by the method of claim 2.

References Cited

UNITED STATES PATENTS

| | | | |
|---|---|---|---|
| 498,141 | 5/1893 | Siebold | 117—216 |
| 1,626,104 | 4/1927 | Swift | 117—227 X |
| 2,592,414 | 4/1952 | Gibson | 117—93.1 X |
| 2,837,447 | 6/1958 | Weindel | 117—228 X |
| 2,900,281 | 8/1959 | Grams | 117—228 X |
| 2,996,412 | 8/1961 | Alexander | 117—221 |
| 3,016,311 | 1/1962 | Stackhouse | 117—71 X |
| 3,019,128 | 1/1962 | Smiley | 117—228 X |
| 3,120,453 | 2/1964 | Fitzer et al. | 117—217 |
| 3,348,929 | 10/1967 | Valtschev et al. | 117—228 X |

FOREIGN PATENTS

| | | |
|---|---|---|
| 783,146 | 9/1957 | Great Britain. |
| 936,912 | 9/1963 | Great Britain. |

ALFRED L. LEAVITT, Primary Examiner

J. R. BATTEN, JR., Assistant Examiner

U.S. Cl. X.R.

13—18; 29—180, 195, 196.2, 197, 198, 199; 117—215, 216, 217, 219, 227, 228, 69, 93.1, 105; 219—121; 313—311, 355